(12) United States Patent
Tanaka et al.

(10) Patent No.: US 7,923,411 B2
(45) Date of Patent: Apr. 12, 2011

(54) ACTIVATED CARBON MATERIAL, AND PRODUCTION METHOD AND USE THEREOF

(75) Inventors: Masako Tanaka, Kawasaki (JP); Yasuo Saito, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 850 days.

(21) Appl. No.: 11/797,972

(22) Filed: May 9, 2007

(65) Prior Publication Data

US 2007/0211411 A1 Sep. 13, 2007

Related U.S. Application Data

(62) Division of application No. 10/332,845, filed as application No. PCT/JP02/09151 on Sep. 9, 2002, now Pat. No. 7,232,790.

(60) Provisional application No. 60/318,623, filed on Sep. 13, 2001, provisional application No. 60/380,858, filed on May 17, 2002.

(30) Foreign Application Priority Data

Sep. 11, 2001 (JP) ................................. 2001-274375
Nov. 22, 2001 (JP) ................................. 2001-357735
Apr. 11, 2002 (JP) ................................. 2002-109638

(51) Int. Cl.
C01B 31/08 (2006.01)
(52) U.S. Cl. ........................................ 502/416; 502/417
(58) Field of Classification Search .................. 502/416, 502/417
See application file for complete search history.

(56) References Cited

U.S. PATENT DOCUMENTS

| | | | |
|---|---|---|---|
| 5,607,770 A | 3/1997 | Lewis et al. | |
| 5,882,621 A * | 3/1999 | Doddapaneni et al. ... | 423/445 R |
| 6,118,650 A | 9/2000 | Maeda et al. | |
| 6,447,555 B1 * | 9/2002 | Okamura et al. ............ | 29/25.03 |
| 6,475,461 B1 | 11/2002 | Ohsaki et al. | |
| 6,874,668 B2 * | 4/2005 | Cumings et al. ................ | 225/3 |
| 7,214,646 B1 | 5/2007 | Fujino et al. | |
| 2002/0039275 A1 | 4/2002 | Takeuchi et al. | |
| 2002/0048144 A1 | 4/2002 | Sugo et al. | |
| 2002/0051903 A1 | 5/2002 | Masuko et al. | |

FOREIGN PATENT DOCUMENTS

| | | |
|---|---|---|
| EP | 0984471 A2 | 3/2000 |
| EP | 0984471 A3 | 3/2000 |
| EP | 1191558 A2 | 3/2002 |
| EP | 1191558 A3 | 3/2002 |
| JP | 538395 A | 1/1978 |
| JP | 55113608 A | 9/1980 |
| JP | 64002314 A | 1/1989 |
| JP | 03-132009 A | 6/1991 |
| JP | 03-237011 A | 10/1991 |
| JP | 04126825 A | 4/1992 |
| JP | 05-009812 A | 1/1993 |
| JP | 06-267794 A | 9/1994 |
| JP | 09-187648 A | 7/1997 |
| JP | 09213590 A | 8/1997 |
| JP | 10199767 A | 7/1998 |
| JP | 11-297578 A | 10/1999 |
| JP | 11-317333 A | 11/1999 |
| JP | 2000-138140 A | 5/2000 |
| JP | 2001-118576 A | 4/2001 |
| JP | 2001-180923 A | 7/2001 |
| JP | 2002-025867 A | 1/2002 |
| JP | 2002-104817 A | 4/2002 |
| JP | 2003-104710 A | 4/2003 |
| SU | 1440959 A | 11/1988 |
| WO | WO 96/30318 A1 | 10/1996 |
| WO | WO 00/12207 A1 | 3/2000 |
| WO | 0113390 A | 2/2001 |
| WO | WO 01/92151 A1 | 12/2001 |

OTHER PUBLICATIONS

Database WPI week 197810 Thomson Scientific, London, GB; AN 1978-18571A; XP 002520437; abstracting JP 53-008395.
Database CA [Online], Chemical Abstracts Service, Columbus, Ohio, US; AN 110:223870; XP 002521076; abstracting JP 64-002314.
Database WPI Week, 199224, Thomson Scientific, London, GB; AN 1992-196315; XP 002520438; abstracting JP 04-126825.
Database WPI Week 198936, Thomson Scientific, London, GB; AN 1989-261678; XP 002521077; abstracting SU 14-40959.

* cited by examiner

*Primary Examiner* — Stuart Hendrickson
(74) *Attorney, Agent, or Firm* — Sughrue Mion, PLLC

(57) ABSTRACT

An activated carbon material having a BET specific surface area of 10 to 1,000 m$^2$/g as measured by means of a nitrogen adsorption method, and the ratio of the height of the D peak (1,360 cm$^{-1}$) of a Raman spectrum of the activated carbon material to that of the G peak (1,580 cm$^{-1}$) of the Raman spectrum is 0.8 to 1.2. When the activated carbon material of the present invention is used as a polarizable electrode material of an electric double layer capacitor, high capacitance per electrode is attained without application of excessive voltage.

9 Claims, 4 Drawing Sheets

ACTIVATED CARBON MATERIAL, AND PRODUCTION METHOD AND USE THEREOF

CROSS REFERENCE TO RELATED APPLICATIONS

This application is a divisional of U.S. application Ser. No. 10/332,845 filed on Jan. 14, 2003, which is a 371 of PCT/JP2002/09151 filed on Sep. 9, 2002, which claims the benefit of U.S. Provisional Application No. 60/318,623 filed Sep. 13, 2001, and U.S. Provisional Application No. 60/380,858 filed May 17, 2002, the disclosures of which are hereby incorporated by reference.

TECHNICAL FIELD

The present invention relates to an activated carbon material which can be employed in a variety of uses including treatment of tap water or wastewater, and as catalyst carrier, gas occlusion material, electrode material for an electric double layer capacitor (also called "electric double layer condenser") and the like as well as to a method for producing the activated carbon material. The present invention also relates to a polarizable electrode containing the activated carbon material and to an electric double layer capacitor containing the electrode and exhibiting high capacitance and high durability.

BACKGROUND ART

Carbon material, particularly activated carbon material, is employed in a variety of fields; for example, it finds utility in treatment of water, catalyst carrier, gas occlusion and electric double layer capacitor electrodes. Among these, an electric double layer capacitor exhibits, for example, the following characteristics: rapid charging and discharging; resistance to excessive charging and discharging; long service life (since it does not undergo chemical reaction); a wide temperature range in which the capacitor can be used; and environmentally friendly nature (since it contains no heavy metal). Therefore, conventionally, an electric double layer capacitor has been employed in, for example, a memory backup power supply. In recent years, electric double layer capacitors of high capacitance have been developed rapidly, and such electric double layer capacitors have been employed in high-performance energy devices. Furthermore, an electric double layer capacitor has been envisaged to be employed in a power storage system in combination with a solar battery or a fuel cell, or to be employed for assisting a gasoline engine of a hybrid car.

An electric double layer capacitor includes a pair of positive and negative polarizable electrodes formed of, for example, activated carbon, the electrodes facing each other with the intervention of a separator in a solution containing electrolyte ions. When DC voltage is applied to the electrodes, anions contained in the solution migrate to the positively polarized electrode, and cations contained in the solution migrate to the negatively polarized electrode. Electric energy is obtained from an electric double layer formed at the interface between the solution and each of the electrodes.

Conventional electric double layer capacitors are excellent in power density but poor in energy density. Therefore, in order to realize employment of such an electric double layer capacitor in energy devices, capacitance of the capacitor must be increased further. In order to increase capacitance of an electric double layer capacitor, an electrode material which enables formation of a large number of electric double layers in an electrolytic solution must be developed.

An electrode predominantly containing activated carbon material is employed as a component constituting an electric double layer capacitor. Such activated carbon material is required to exhibit, as a key function, high capacitance per mass or per volume.

In view of the foregoing, use of an activated carbon material having a large specific surface area has been contemplated as an electrode material which enables formation of a large number of electric double layers. When such an activated carbon material is employed, capacitance per mass (F/g) increase, but capacitance per volume (F/ml) fails to increase to an intended level, because of lowering of electrode density.

In recent years, there has been proposed an approach to production of an activated carbon material containing microcrystals similar to those of graphite, along with employment of the thus-produced activated carbon material as a raw material for forming a polarizable electrode (Japanese Patent Application Laid-Open (kokai) No. 11-317333). In view that an electric double layer capacitor including a polarizable electrode formed from the activated carbon material exhibits high capacitance, the activated carbon material is considered an excellent electrode material.

However, the aforementioned activated carbon material is not necessarily satisfactory, in that it involves some problems. That is, since expansion of the activated carbon material occurs during application of voltage, as described in the above publication, a size-limiting structure must be provided for suppressing expansion of the activated carbon material, and thus difficulty is encountered in assembling a capacitor. In addition, application of a voltage of as high as about 4 V is required in advance in order to obtain sufficient capacitance of the capacitor. As a result, decomposition of an electrolytic solution may occur.

In a typical method for producing activated carbon material, an organic substance such as coconut shell, pitch, or phenol resin is thermally decomposed to thereby yield a carbonized material, and the carbide is activated.

Examples of activation methods include gas activation employing steam or carbon dioxide gas, and chemical activation employing, for example, potassium sulfide, zinc chloride, or an alkali hydroxide. Particularly, activation employing an alkali hydroxide such as potassium hydroxide or sodium hydroxide is effective for producing an activated carbon material having a large specific surface area, and an activated carbon material produced through this activation method exhibits high capacitance per mass or per volume.

When alkali activation, for example, activation employing an alkali hydroxide, is employed, an alkali metal compound is melted through heating, and a carbon material is impregnated and reacted with the molten alkali metal compound, to thereby form a porous structure and activate the carbon material. When alkali activation of powdery or granular carbon raw material is employed in a container such as a crucible, effervescence of a molten liquid occurs during activation, due to generation of, for example, moisture or hydrogen gas, and the molten liquid may overflow the container. Particularly when alkali activation is carried out at high temperature increase rate, the amount of gas generated in a unit time increases, and overflow of the molten liquid tends to occur. In order to avoid such overflow, the amounts of an alkali metal compound and a carbon raw material which are placed in a container must be limited, and therefore productivity of an alkali-activated carbon material is considerably lowered, resulting in high production cost.

Accordingly, an object of the present invention is to provide an activated carbon material which enables capacitance per electrode to be increased without application of a high voltage.

Another object of the present invention is to drastically improve the productivity in the activation of an activated carbon material and to produce an activated carbon material which is excellent in capacitance at high current density.

SUMMARY OF THE INVENTION

The present invention has been accomplished as a result of extensive investigations for solving the aforementioned problems and provides an activated carbon material, the production method and the use thereof shown below.

1. A method for producing an activated carbon material, wherein the method comprises a step of thermally treating coal-based pitch at two temperature ranges of 400° C. to 600° C. and 600° C. to 900° C.; and a step of mixing and heating the thus-treated coal-based pitch with an alkali metal compound for the activation thereof.
2. The method for producing an activated carbon material according to 1 above, wherein the alkali metal compound is at least one alkali hydroxide selected from the group consisting of sodium hydroxide, potassium hydroxide, and cesium hydroxide.
3. The method for producing an activated carbon material according to 1 above, wherein the step of thermally treating coal-based pitch at two temperature ranges is carried out in a vapor of an alkali metal.
4. The method for producing an activated carbon material according to 3 above, wherein the alkali metal compound is at least one species selected from the group consisting of potassium, sodium, and cesium compounds.
5. The method for producing an activated carbon material according to 1 above, wherein the step for the activation comprises adding a fibrous material to the coal-based pitch.
6. The method for producing an activated carbon material according to 5 above, wherein the amount of the fibrous material is not less than 0.05 mass % as a corresponding mass of the fibrous material heated at 800° C. in an inert atmosphere on the basis of the coal-based pitch.
7. The method for producing an activated carbon material according to 5 or 6 above, wherein the outer diameter of each fiber filament of the fibrous material is 1000 nm or less.
8. The method for producing an activated carbon material according to any one of 5 to 7 above, wherein the fibrous material is a material capable of maintaining its shape up to at least 300° C.
9. The method for producing an activated carbon material according to any one of 5 to 8 above, wherein the fibrous material is at least one species selected from the group consisting of a fibrous carbon, carbonized material of organic fiber, unmeltable fiber, beaten pulp and cellulose fiber.
10. The method for producing an activated carbon material according to 9 above, wherein the fibrous carbon is at least one species selected from the group consisting of a carbon nano tube, whiskers, vapor grown carbon fiber, carbon fiber ribbon and coiled carbon fiber.
11. The method for producing an activated carbon material according to 10 above, wherein each fiber filament of the vapor grown carbon fiber contains a hollow space extending along its center axis, and has an outer diameter of 2 to 500 nm and an aspect ratio of 10 to 15,000.
12. The method for producing an activated carbon material according to 11 above, wherein the vapor grown carbon fiber is branched carbon fiber.
13. An activated carbon material produced through a production method as recited in any one of 1 to 12 above.
14. The activated carbon material according to 13 above, which has a BET specific surface area of 10 to 1,000 $m^2/g$ as measured by means of a nitrogen adsorption method, and contains no graphite microcrystals.
15. The activated carbon material according to 13 or 14 above, wherein the ratio of the height of the D peak (1,360 $cm^{-1}$) of a Raman spectrum of the activated carbon material to that of the G peak (1,580 $cm^{-1}$) of the Raman spectrum is 0.8 to 1.2.
16. The activated carbon material according to any one of 13 to 15 above, wherein pores of the activated carbon material having a size of 20 to 50 Å as measured by means of a BJH method employing nitrogen adsorption have a pore volume of at least 0.02 ml/g.
17. A polarizable electrode material comprising a activated carbon material as recited in any one of 13 to 16 above and optionally vapor grown carbon fiber.
18. The polarizable electrode material according to 17 above, wherein the amount of the vapor grown carbon fiber is 0.05 to 50 mass %.
19. The polarizable electrode material according to 17 or 18 above, wherein each fiber filament of the vapor grown carbon fiber contains a hollow space extending along its center axis, and has an outer diameter of 2 to 500 nm and an aspect ratio of 10 to 15,000.
20. The polarizable electrode material according to any one of 17 to 19 above, wherein the vapor grown carbon fiber contains micropores having a pore volume of 0.01 to 0.4 ml/g, and has a BET specific surface area of 30 to 1,000 $m^2/g$ as measured by means of a nitrogen adsorption method.
21. An electric double layer capacitor comprising a polarizable electrode prepared from a polarizable electrode material as recited in any one of 17 to 20 above.
22. A method for producing an activated carbon material, wherein the method comprises adding an alkali metal compound as an activating agent and a fibrous material to a carbonaceous raw material and heating the mixture.
23. The method for producing an activated carbon material according to 22 above, wherein the amount of the fibrous material is not less than 0.05 mass % as a corresponding mass of the fibrous material heated at 800° C. in an inert atmosphere on the basis of the carbonaceous raw material.
24. The method for producing an activated carbon material according to 22 or 23 above, wherein the outer diameter of each fiber filament of the fibrous material is 1000 nm or less.
25. The method for producing an activated carbon material according to any one of 22 to 24 above, wherein the fibrous material is a material capable of maintaining its shape up to at least 300° C.
26. The method for producing an activated carbon material according to any one of 22 to 25 above, wherein the fibrous material is at least one species selected from the group consisting of a fibrous carbon, carbonized material of organic fiber, unmeltable fiber, beaten pulp and cellulose fiber.
27. The method for producing an activated carbon material according to 26 above, wherein the fibrous carbon is at least one species selected from the group consisting of a carbon nano tube, whiskers, vapor grown carbon fiber, carbon fiber ribbon and coiled carbon fiber.

28. The method for producing an activated carbon material according to 27 above, wherein each fiber filament of the vapor grown carbon fiber contains a hollow space extending along its center axis, and has an outer diameter of 2 to 500 nm and an aspect ratio of 10 to 15,000.
29. The method for producing an activated carbon material according to 28 above, wherein the vapor grown carbon fiber is branched carbon fiber.
30. An activated carbon material having a fibrous material fused onto at least a portion of the surface of the activated carbon material particle.
31. The activated carbon material according to 30 above, which assumes a spherical shape.
32. An activated carbon material produced through a method for producing an activated carbon material as recited in any one of 22 to 29 above.
33. A polarizable electrode comprising, as an electrode material, an activated carbon material as recited in any one of 30 to 32 above.
34. An electric double layer capacitor comprising a polarizable electrode as recited in 33 above.

DESCRIPTION OF THE INVENTION

Figure 1:
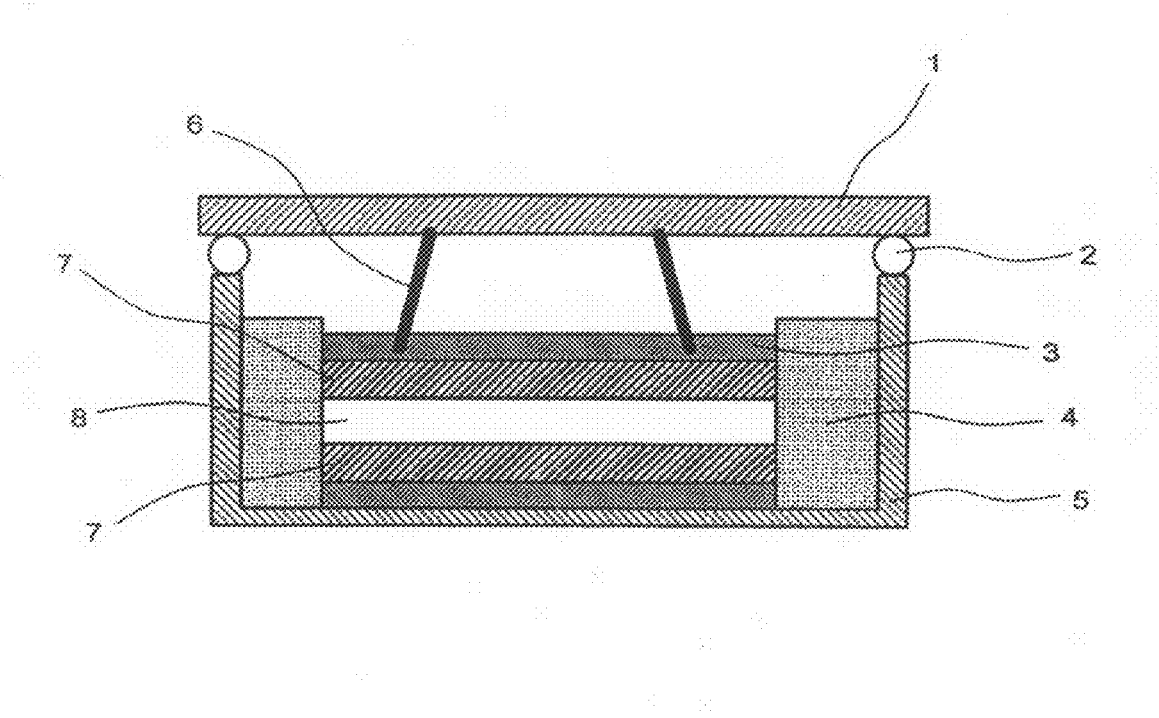
FIG. 1 is a cross-sectional view showing a cell employed for evaluating an electric double layer capacitor.

Electric characteristics of an activated carbon material greatly vary with structural characteristics, including specific surface area, pore distribution, and crystal structure of the activated carbon material. Such structural characteristics of the activated carbon material are determined on the basis of the structure of a raw material, carbonization conditions, and activation conditions.

Therefore, in order to produce an activated carbon material useful as an electrode material, the structure of a raw material, carbonization conditions, and activation conditions must be optimized. The present inventors have considered that coal-based pitch is suitably employed as a raw material for producing an activated carbon material. As compared with a petroleum-based carbon raw material, coal-based pitch has a small number of side chains, contains aromatic compounds at high proportions, and contains polycyclic aromatic compounds of different molecular structures. Therefore, when an activated carbon material is produced from coal-based pitch, conceivably, a variety of complicated microcrystalline structures derived from such compounds are formed in the activated carbon material, and thus the activated carbon material exhibits excellent electric characteristics.

No particular limitation is imposed on the coal-based pitch which may be employed. However, coal-based pitch having a softening point of 100° C. or lower is preferred, and coal-based pitch having a softening point of 60° C. to 90° C. is more preferred.

Such coal-based pitch is subjected to two-stage heat treatment including firing and carbonization at temperature ranges of 400 to 600° C. and 600 to 900° C., preferably 450 to 550° C. and 650 to 850° C.

When coal-based pitch is heated at 400 to 600° C., thermal decomposition reaction proceeds, gas and light components are removed from the pitch, polycondensation of the residue occurs, and finally the pitch is solidified. In this first-stage carbonization step, the state of microscopic bonding between carbon atoms is substantially determined, and the crystalline structure determined in this step determines the fundamental structure of an activated carbon material (i.e., a final product).

In the first-stage carbonization step, the temperature increase rate is preferably 3 to 10° C./hour, more preferably 4 to 6° C./hour; and the maintenance time at the maximum temperature is preferably 5 to 20 hours, more preferably 8 to 12 hours.

Subsequently, the second-stage heat treatment is carried out at a temperature range of 600 to 9.0° C. In this second-stage carbonization step, the temperature increase rate is preferably 3 to 10° C./hour, more preferably 4 to 6° C./hour; and the maintenance time at the maximum temperature is preferably 5 to 20 hours, more preferably 8 to 12 hours.

The above heat treatment (carbonization) steps are effectively carried out in a vapor of an alkali metal. An alkali metal serves as a catalyst in the carbonization step. That is, an alkali metal promotes cross-linking between aromatic compounds contained in the pitch, to thereby allow carbonization to proceed. Examples of the alkali metals include compounds of sodium, potassium and cesium.

The heat treatment method in a vapor of an alkali metal can be conducted, for example, by heating the carbonization step system while introducing to the system a vapor of an alkali metal vaporized from the alkali activation reaction system described below. Alternatively, the heat treatment step can be conducted by placing pitch material around the vessel for the reaction alkali activation reaction to expose the pitch material to an alkali metal vapor vaporized from the alkali activation reaction system while heating the pitch material, thereby concurrently effecting the heat treatment (carbonization) and alkali activation reaction steps. This method shortens the total treatment time and also reduces the cost for heating.

Subsequently, the carbonized material (thermally treated carbonaceous material) is subjected to pulverization so as to attain a particle size of about 1 to about 100 μm, and the thus-pulverized product is mixed with an alkali metal compound and then heated so as to form pores in the carbonized product, thereby producing an activated carbon material.

In an activation method employing an alkali metal compound (an alkali activation method), a carbonaceous raw material (e.g., a carbonized material) is uniformly impregnated with an alkali metal compound, and the carbonaceous raw material is heavily corroded by the alkali metal compound under heating (firing), to thereby produce an activated carbon material having an intricately developed porous structure.

The activation step is preferably conducted with a fibrous material mixed with the raw material. Expansion of an alkali molten liquid can be suppressed by mixing a fibrous material, which enables the productivity to be improved. Furthermore, the fibrous carbon exhibiting excellent electrical conductivity (e.g., vapor grown carbon fiber) is melt-bonded onto the surfaces of the resultant activated carbon particles, and contact resistance between the activated carbon particles can be reduced. As a result, when the activated carbon is used as a polarizable electrode for an electric double layer capacitor, properties such as capacitance holding properties (cycle properties) thereof are improved.

Similar effects can be obtained by using other carbonaceous materials in place of a coal-based pitch as a carbonaceous raw material in the alkali activation method comprising mixing of a fibrous material.

No particular limitation is imposed on the other carbonaceous material employed in the production method of the present invention. Examples of the carbonaceous raw material which may be employed include products obtained through carbonization of coconut shell, coffee bean, lignin, sawdust, polyvinylidene chloride, phenol resin, coal, coal tar, coal coke, and petroleum coke; PAN-based carbon fiber; and pitch-based carbon fiber. Carbonization of a carbonaceous raw material can be carried out in a method other than two-stage heating. A carbonaceous raw material is carbonized typically at 400 to 1,000° C. but a material which has not undergone carbonization may be mixed with an alkali metal compound. When a carbonaceous raw material is carbonized at a temperature higher than 1,000° C., the activation rate of the resultant material is lowered, and activation of the material requires a long period of time. The particle size of a carbonaceous raw material may be that of a 10-mesh sieve (ASTM standards, mesh size: 2.0 mm) or rougher one. However, the particle size of a carbonaceous raw material is preferably that of a residue obtained through sieving by use of a sieve of 10 mesh or less, more preferably, 50 mesh (mesh size: 0.297 mm) or less, much more preferably 100 mesh (mesh size: 0.149 mm) or less.

No particular limitation is imposed on the fibrous carbon usable in the present invention, so long as the fibrous carbon can maintain its shape up to 300° C. and hold an alkali molten liquid. Examples of the fibrous carbon which may be employed include a fibrous carbon (e.g. carbon nano tube, whiskers, vapor grown carbon fiber, carbon fiber ribbon and coiled carbon fiber), beaten pulp products, cellulose fibers (e.g. natural fiber, regenerated cellulose), carbonized material of organic fiber (e.g., PAN) and unmeltable fiber. These fibers may be employed in combination of two or more species. The term "unmeltable fiber" as used herein refers to a fiber made from a spun fiber such as melt spinning fiber, centrifugal spinning fiber and the like which has been subjected to a heat treatment in an oxidizing atmosphere such as air and oxygen thereby provided with bridges between fiber constituting molecules and thus prevented from getting out of its shape during the subsequent heat treatment.

No particular limitation is imposed on the shape of the fibrous carbon, so long as the fibrous carbon can suppress expansion of an alkali molten liquid during activation. Examples of the shape of the fibrous carbon include a ribbon-like shape which has a flat cross section, a coiled shape (e.g. coil, spiral, helix and spring), carbon spring, carbon microcoil, helical polyacetylene and the like.

The reason why expansion of an alkali molten liquid can be suppressed by addition of fibrous carbon has not yet been fully elucidated. Conceivably, an alkali molten liquid is held in fibrous carbon. Branched fibrous carbon of small diameter exerts the effect of suppressing expansion of an alkali molten liquid. The outer diameter of fibrous carbon to be employed is typically 1000 nm or less, preferably 500 nm or less, more preferably 10 nm or more and 400 nm or less. Those which have been fibrilized (i.e. made into fibrils) such as beaten pulp (cellulose fibers mechanically squashed or cut in water or the like) can be also used. In this case, the outer diameter of the primary fiber can be 10 µm or more as long as that of each fibril is 1 µm (1000 nm) or less.

The amount of fibrous material added to a carbon raw material may be determined in consideration of intended physical properties of a final product, production cost, the effect of suppressing expansion of a molten liquid depending on the shape of the fibrous carbon, dispersibility of the fibrous carbon, the relation between temperature increase rate and the degree of expansion of the molten liquid. In the case that an organic fiber such as pulp and the like is used, decrease in the mass thereof may occur during the process due to carbonization and accordingly, the amount of the fiber to be added is more than that in case of fibrous carbon. Typically, it is sufficient that the amount of the fibrous material is not less than 0.05 mass % as a corresponding mass of the fibrous material heated at 800° C. in an inert atmosphere for 60 to 600 minutes. When the amount of the fibrous material is too low, expansion of the molten liquid cannot be sufficiently suppressed. Addition of a fibrous material having an excellent conductivity is more advantageous since such a fiber lowers the contact resistance between the resulted activated carbon particles.

As a conductive fiber, vapor grown carbon fiber is preferably used since the vapor grown carbon fiber contains carbon crystals grown along the axis of each fiber filament of the fiber and contact resistance between activated carbon particles can be effectively reduced. Vapor grown carbon fiber can be produced by feeding a gasified organic compound such as benzene into a high-temperature atmosphere together with a transition metallic compound serving as a catalyst.

The vapor grown carbon fiber to be employed may be as-produced carbon fiber; carbon fiber which has undergone heat treatment at, for example, 800 to 1,500° C., or carbon fiber which has undergone graphitization at, for example, 2,000 to 3,000° C. However, as-produced carbon fiber or carbon fiber which has undergone heat treatment at about 1,500° C. is more preferred.

Preferably, the vapor grown carbon fiber employed in the present invention is branched carbon fiber. More preferably, each fiber filament of the branched carbon fiber has a hollow structure in which a hollow space extends throughout the filament, including a branched portion thereof, sheath-forming carbon layers of the filament assume uninterrupted layers. As used herein, the term "hollow structure" refers to a structure in which a plurality of carbon layers form a sheath. The hollow structure encompasses a structure in which sheath-forming carbon layers form an incomplete sheath; a structure in which the carbon layers are partially broken; and a structure in which the laminated two carbon layers are formed into a single carbon layer. The cross section of the sheath does not necessarily assume a round shape, and may assume an elliptical shape or a polygonal shape. No particular limitation is imposed on the interlayer distance (d002) of carbon crystal layers. The interlayer distance (d002) of the carbon layers as measured through X-ray diffraction is preferably 0.339 nm or less, more preferably 0.338 nm or less. The thickness (Lc) of the carbon crystal layer in the C axis direction is 40 nm or less.

The outer diameter of each fiber filament of the vapor grown carbon fiber is 2 to 500 nm, and the aspect ratio of the filament is 10 to 15,000. Preferably, the fiber filament has an outer diameter of 50 to 500 nm and a length of 1 to 100 µm (i.e., an aspect ratio of 2 to 2,000); or an outer diameter of 2 to 50 nm and a length of 0.5 to 50 µm (i.e., an aspect ratio of 10 to 25,000).

When the carbon material is activated with the alkali metal compound, a portion of low crystallinity contained in the surface of the carbon material is corroded by the alkali metal compound. In the case where the carbon fiber is mixed with the carbon material, while the surface of the carbon material is corroded, the carbon fiber which is present in the vicinity of the carbon material is melt-bonded to the carbon material, and thus, the carbon fiber is melt-bonded onto the surfaces of the resultant activated carbon particles. Such melt-bonding of carbon fibers onto the surface of the activated carbon material reduces the contact resistance between the activated carbon particles and improves the capacitance at a high current density.

The melt-bonded state include not only such a state where the carbonaceous surface layer of a fibrous material, for example, carbon fiber and that of an activated carbon material are molten and bonded to each other at points but also a state where those surface layers are not molten but bonded to each other at their solid surfaces.

The amount of carbon fiber mixed with the carbon material is preferably not less than 0.05 mass %, more preferably 0.1 to 50 mass %, most preferably 1 to 30 mass %. When the amount of the carbon fiber is less than 0.05 mass %, since the amount of the melt-bonded carbon fiber is small, the effect of reducing the contact resistance between the activated carbon particles is also small, the improvement in charge/discharge characteristics at high current density are not sufficiently obtained, and the effect of suppressing the expansion the molten liquid is small.

When the amount of carbon fiber to be mixed with is smaller than the mixing ratio of the conductive material to the activated carbon for forming an electric double-layer capacitor, additional amount of carbon fiber may be added to the resulted activated carbon to form a capacitor. Alternatively, commonly used conductive material such as carbon black may be added.

In contrast, when the amount of carbon fiber to be mixed with is larger than the normal mixing ratio of the conductive material to the activated carbon for forming an electric double-layer capacitor, suitable amount of carbon fiber may be added to a common activated carbon for enhancing electric conductivity to form an electric double-layer capacitor.

For example, when the carbon fiber is added in an amount of 0.05 to 10 mass % and the activation is effected, the product may be used for a polarizable electrode as it is, or alternatively, carbon fiber and/or carbon black may be further added to the product to form a polarizable electrode. When the amount of carbon fiber added exceeds 50 mass %, the activated product may be added in an amount of 10 to 50 mass % of to 90 to 50 mass % of the activated carbon to form a polarizable electrode.

No particular limitation is imposed on the alkali activation agent, so long as the agent is a compound containing an alkali metal. The present invention is effectively applied to substances which melt during activation. Preferred examples of the alkali activation agent include hydroxides, carbonates, sulfides, and sulfates of potassium, sodium, and calcium. Specific examples of the alkali activation agent which may be employed include potassium hydroxide, sodium hydroxide, cecium hydroxide, potassium carbonate, sodium carbonate, potassium sulfide, sodium sulfide, potassium thiocyanate, potassium sulfate, and sodium sulfate. Potassium hydroxide and sodium hydroxide are preferred, and potassium hydroxide is more preferred. These compounds may be employed singly or in combination of two or more species.

The amount of an alkali metal compound mixed with a carbonaceous raw material may be determined in accordance with crystallinity of the carbonaceous raw material, the amount of a surface functional group of the carbonaceous raw material, and the intended use of an activated carbon material to be produced. When crystallinity of the carbonaceous raw material is high and the amount of a surface functional group of the raw material is small, the amount of an alkali metal compound which is required tends to increase. For example, when potassium hydroxide is employed, the ratio by mass of potassium hydroxide to the carbonaceous raw material is about 0.5 to about 7, preferably about 1 to about 5, more preferably about 2 to about 4. When the ratio by mass of potassium hydroxide is less than 0.5, micropores are insufficiently developed, whereas when the ratio by mass is 7 or more, excessive activation proceeds and the walls of micropores are broken, so that the number of micropores decreases, and thus the specific surface area of the resultant activated carbon material tends to be reduced.

The activation temperature varies with the type and shape of a raw material and the activation reaction rate. The activation temperature is typically 250 to 1,000° C., preferably 500° C. to 900° C., more preferably 600° C. to 800° C. When the activation temperature is 400° C. or lower, activation proceeds insufficiently, the number of micropores contained in an activated carbon material becomes small, and capacitance when used as a polarizable electrode material in an electric double layer capacitor is lowered. When the activation temperature is 1,000° C. or higher, there arise problems, including shrinkage of micropores contained in an activated carbon material, considerable deterioration of charge characteristics at high current density, and corrosion of an activation apparatus.

The temperature increase rate during activation may be determined whether fibrous carbon is added or not or in consideration of the amount of fibrous carbon to be added, and the degree of expansion of an alkali molten liquid. When the temperature increase rate is high, the amount of moisture removed from an alkali metal compound per unit time increases, and the amount of gas (e.g., hydrogen gas) generated from the alkali metal compound per unit time increases, and thus the alkali metal compound tends to overflow a container. In contrast, when the temperature increase rate is low, the yield of an activated carbon material per container increases, but productivity is lowered. The temperature increase rate is typically 400 to 1° C./hour.

For example, when the temperature increase rate is 300° C./hour, the total volume of a carbonaceous raw material, fibrous carbon, and an alkali metal compound to be placed in a container (crucible) is 15% that of the entire volume of the container. When the temperature increase rate is lowered to 20° C./hour or less, the amount of gas generated per unit time can be reduced, and the yield of an activated carbon material per container can be increased. However, from the viewpoint of productivity, preferably, the total amount of a carbonaceous raw material, fibrous carbon, and an alkali metal compound to be placed in a container is increased to a possibly maximum level, and activation is carried out at a high temperature increase rate.

As a result of activation, numerous basket-like micropores having a size of 2 to 5 nm (20 to 50 Å) are formed between several carbon layers, the number of micropores which has a radius of about 1 to about 2 nm (about 10 to about 20 Å) and which is suitable for, for example, adsorption is increased, and the adsorption volume of an activated carbon material is increased.

The thus-produced activated carbon material exhibits high capacitance at the first cycle of charge/discharge testing without application of excessive voltage, and exhibits high percent maintenance of the capacitance.

Figure 3:
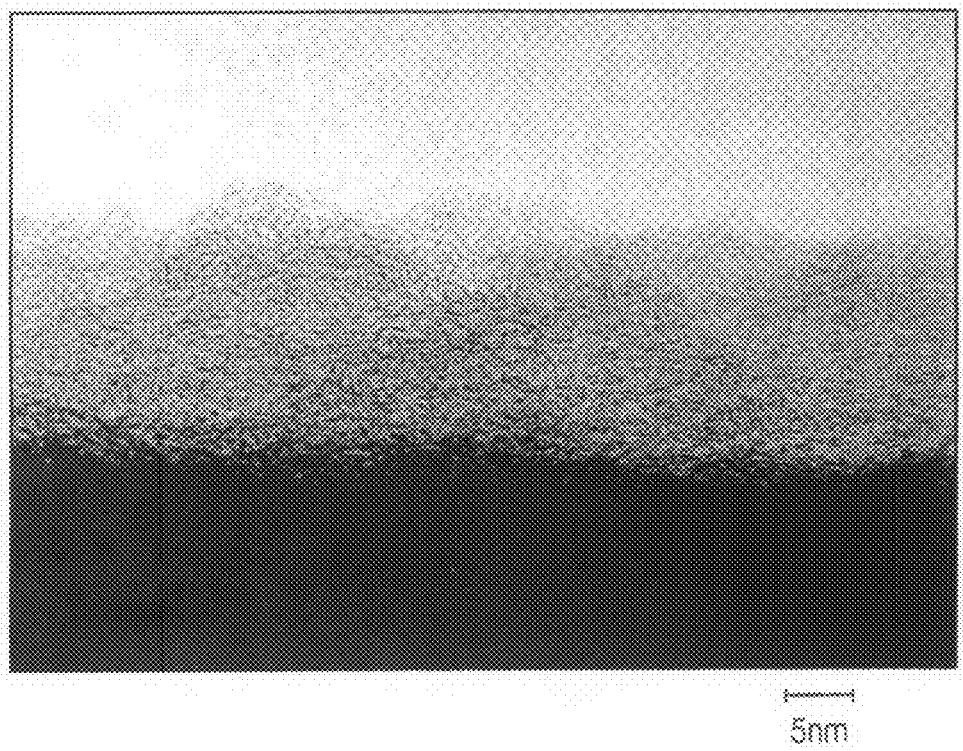
FIG. 3 shows a transmission electron microscope (TEM) photograph of the activated carbon material produced in Example 3 (magnification: ×2,000,000).

When the activated carbon material was observed under a transmission microscope, the material was found to contain no microcrystals similar to those of graphite, and to have merely a turbostratic structure as shown in FIG. 3. The ratio of the height of the D peak (1360 cm$^{-1}$) of a Raman spectrum of the material to the height of the G peak (1580 cm$^{-1}$) of the Raman spectrum (i.e., height from the base line to the peak point as measured on the basis of the spectrum) in an observed curve was found to be 0.8 to 1.2.

Here, the ratio of the intensity of the D peak to that of the G peak is used as an indicator to indicate the graphitization degree of carbon material, and the intensity ratio expressed as the peak height ratio becomes a smaller value as the graphitization degree is larger. The value in an activated carbon containing microcrystals is generally on the order of 0.6 and the present activated carbon containing no microcrystals exhibited values of 0.8 to 1.2.

Furthermore, an activated carbon black to be used in an electrode of a capacitor is required to have micropores of 0.20 to 50 Å, which is considered to attribute to the capacitance and the expansion of the electrolyte, in a certain amount of more.

The BET specific surface area of the activated carbon material of the present invention determined by nitrogen adsorption method was found to be 10 to 1,000 m$^2$/g, which is smaller than that of the conventionally obtained activated carbon materials (usually in the range of 2,000 to 3,000 m$^2$/g). The pore volume of pores having a size of 20 to 50 Å of the activated carbon material of the present invention as measured by means of a BJH (Barrett, Joyner and Halenda) method was found to be 0.02 ml/g or more.

Due to the crystalline structure and micropore structure, the activated carbon material exhibits a high capacitance from the first charge/discharge cycle without application of excessive voltage for intercalation of ions between graphite layers. In addition, conceivably, since the activated carbon material has undergone sufficient carbonization, the amount of functional groups on the surface of the material is reduced, and lowering of capacitance can be prevented.

The tapping density of the thus produced activated carbon material was measured by use of a tapping density meter (product of Kuramochi Kagaku Kikai Seisakusho), and found to be 0.35 to 0.70 g/ml (tapping: 50 times). The powder resistance of the activated carbon material was found to be 0.4 Ωcm or less at 1.0 MPa.

When vapor grown carbon fiber is added to the thus-produced activated carbon material, characteristics of the activated carbon material are further improved. Similar vapor grown carbon fiber as described above can be employed for that purpose. When the alkali activation has been effected after the addition of vapor grown carbon fiber, vapor grown carbon fiber can be added if required.

When the activated carbon material is mixed with vapor grown carbon fiber, contact resistance between activated carbon particles is reduced. Therefore, when a polarizable electrode is formed from the resultant mixture, the electrode exhibits enhanced strength and improved durability.

Vapor grown carbon fiber to be employed may be as-produced carbon fiber which has undergone firing at 1,000 to 1,500° C., or carbon fiber which has undergone firing and then graphitization.

Vapor grown carbon fiber which has undergone gas activation or chemical activation may be employed. When such vapor grown carbon fiber is employed, preferably, the surface of the carbon fiber may be controlled such that micropores (i.e., pores having a size of 20 Å or less) contained in the carbon fiber have a pore volume of 0.01 to 0.4 ml/g, and the carbon fiber has a BET specific surface area of 30 to 1,000 m$^2$/g. When carbon fiber containing a large number of micropores is mixed with the activated carbon material, ion diffusion resistance in an electrode formed from the resultant mixture increases.

The amount of vapor grown carbon fiber mixed with the activated carbon material is preferably 0.02 mass % to 50 mass %, more preferably 0.05 to 30 mass %. When the amount of the carbon fiber is 0.02 mass % or less, since contact points between the carbon fiber and activated carbon particles increase insufficiently, satisfactory effects fail to be obtained. In contrast, when the amount of the carbon fiber is 50 mass % or more, the activated carbon content of a polarizable electrode is lowered, resulting in lowering of capacitance.

A polarizable electrode and an electric double layer capacitor can be produced from the activated carbon material of the present invention through any known method. Specifically, a polarizable electrode is produced through, for example, the following methods: a method in which an electrically conductive agent and a binder are added to the activated carbon material, and the resultant mixture is subjected to kneading and rolling; a method in which an electrically conductive agent, a binder, and if desired, a solvent are added to the activated carbon material to thereby prepare a slurry, and the resultant slurry is applied in a predetermined thickness to an electrically conductive material followed by removing the solvent by evaporation at room or elevated temperature; and a method in which a non-carbonized resin is mixed with the activated carbon material, and the resultant mixture is sintered. Examples of the electrically conductive material usable for this purposes include a foil or a plate of aluminum, carbon-coated aluminum, stainless steel, titanium and the like having a thickness of about 10 μm to about 0.5 mm.

For example, if desired, an electrically conductive agent (e.g., carbon black) is added to the powdery activated carbon material having an average particle size of about 5 to about 100 μm; a binder such as polytetrafluoroethylene (PTFE) or polyvinylidene fluoride is added to the resultant mixture; the resultant mixture is formed into a sheet having a thickness of about 0.1 to about 0.5 mm; and the thus-formed sheet is dried under vacuum at a temperature of about 100 to about 200° C. Electrodes having a predetermined shape are formed from the sheet through punching. A metallic plate serving as a collector is laminated on each of the electrodes, to thereby form a laminate. A separator is sandwiched by the thus-formed two laminates such that the metallic plates are positioned outside, and the resultant laminate is immersed in an electrolytic solution, to thereby produce an electric double layer capacitor.

Any known electrolytic solution containing a non-aqueous solvent or any known water-soluble electrolytic solution may be employed as an electrolytic solution for the electric double layer capacitor.

Examples of aqueous systems (aqueous electrolytic solutions) include a sulfuric acid aqueous solution, a sodium sulfate aqueous solution, a sodium hydroxide aqueous solution, a potassium hydroxide aqueous solution, an ammonium hydroxide aqueous solution, a potassium chloride aqueous solution, and a potassium carbonate aqueous solution.

A preferred non-aqueous system (non-aqueous electrolytic solution) is prepared from an organic solvent, and a quaternary ammonium salt or a quaternary phosphonium salt (i.e., electrolyte) containing a cation represented by $R^1R^2R^3R^4N^+$ or $R^1R^2R^1R^4P^+$ (wherein each of $R^1$, $R^2$, $R^3$, and $R^4$ represents a C1-C10 alkyl group or a C1-C10 allyl group) and an anion such as $BF_4^-$, $PF_6^-$, or $ClO_4^-$. Examples of the organic solvents include ethers such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, and ethylene glycol phenyl ether; amides such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, and hexamethylphosphoryl amide; sulfur-containing compounds such as dimethyl sulfoxide and sulfolan; dialkyl ketones such as methyl ethyl ketone and methyl isobutyl ketone; cyclic ethers such as ethylene oxide, propylene oxide, tetrahydrofuran, 2-methoxytetrahydrofuran, 1,2-dimethoxyethane, and 1,3-dioxolan; carbonates such as ethylene carbonate and propylene carbonate; γ-butyrolactone; N-methylpyrrolidone; acetonitrile; and nitromethane. Preferred examples which may be employed include carbonate-based non-aqueous solvents such as ethylene carbonate and propylene carbonate. These electrolytes or solvents may be employed in combination of two or more species.

No particular limitation is imposed on the separator which, if desired, is provided between electrodes, so long as the separator is an ion-permeable porous separator. Preferred examples of separators which may be employed include microporous polyethylene film, microporous polypropylene film, polyethylene nonwoven fabric, polypropylene nonwoven fabric, glass-fiber-mixed nonwoven fabric, and glass mat filter.

MODE FOR CARRYING OUT THE INVENTION

The present invention will next be described in more detail by way of illustrative examples, which should not be construed as limiting the invention thereto. In the following examples, characteristics of activated carbon materials and electric double layer capacitors were evaluated by means of the below-described methods.
(1) Measurement of BET Specific Surface Area and Pore Volume
BET specific surface area and pore volume were calculated by means of a BET method and a BJH method, on the basis of an adsorption isotherm of nitrogen as measured at liquid nitrogen temperature by use of NOVA1200 (product of Quantachrome Instruments). The amount of adsorbed nitrogen was measured at a relative pressure (P/PO) of 0.01 to 1.0.
(2) Measurement of Raman Spectrum
The Raman spectrum of a carbon material serving as a raw material for producing an activated carbon material was measured under the following conditions: excitation light source: Ar laser (514.5 nm), detector: charge coupled device (CCD), slit width: 500 μm, exposure time: 60 seconds.
(3) Capacitance
Polytetrafluoroethylene (PTFE) (10 parts by mass) and carbon black (10 parts by mass) were added to an activated carbon material having an average particle size of 30 μm (80 parts by mass), the resultant mixture was kneaded in an agate mortar, and the thus-kneaded product was subjected to rolling by use of a roller, to thereby form a sheet having a thickness of 0.5 mm. The thus-formed sheet was subjected to punching to thereby form a disk having a diameter of 20 mm, and the disk was dried at 200° C. under vacuum overnight. The resultant disk was employed as a polarizable electrode.

A cell for evaluation as shown in FIG. 1 was assembled from the aforementioned electrode in a glove box through which argon of high purity was circulated. In FIG. 1, reference numeral 1 represents an upper lid formed of aluminum, 2 an O ring formed of fluorine rubber, 3 collectors formed of aluminum, 4 an insulator formed of Teflon®, 5 a container formed of aluminum, 6 a leaf spring formed of aluminum, 7 polarizable electrodes, and 8 a separator formed of glass fiber (thickness: 1 mm). LIPASTE-P/EAFIN (product of Tomiyama Pure Chemical Industries, Ltd.) (1 mol/liter), containing propylene carbonate (PC) serving as a solvent and $(C_2H_5)_4NBF_4$ serving as an electrolyte, was employed as an electrolytic solution.

Charging and discharging were carried out at a current of 5 mA (1.6 mA/cm$^2$), 50 mA (16 mA/cm$^2$) and 150 mA (48 mA/cm$^2$) and 0 to 2.5 V or 0 to 3.0 V by use of a charge/discharge test apparatus (HJ-101SM6, product of Hokuto Denko Co., Ltd.). A discharge curve obtained through the second constant-current discharging was used to calculate capacitance (F/g) of an electric double layer capacitor per mass of activated carbon contained in the electrodes of the capacitor, along with capacitance (F/ml) of the capacitor per volume of the activated carbon.

Durability was evaluated on the basis of percent maintenance of capacitance (i.e., the ratio of capacitance after 20-cycle charge/discharge testing to capacitance after the second-cycle charging/discharging).

EXAMPLE 1

Coal pitch (product of Kawasaki Steel Corporation) having a softening point of 86° C. was subjected to first-stage heat treatment at 500° C. and then to second-stage heat treatment at 700° C. The resultant carbonaceous material was mixed with KOH such that the ratio by mass of the KOH to the coal pitch was 2.5, and the resultant mixture was placed in a crucible. The crucible was heated to 750° C. at 3° C./hour, and the temperature of the crucible was maintained at 750° C. for 60 minutes, to thereby allow activation of the pitch to proceed. The thus-activated carbon material washed with 1N hydrochloric acid, and then washed with distilled water, to thereby remove residual KOH and metallic impurities. The thus-washed carbon material was dried under vacuum at 200° C., to thereby produce an activated carbon material.

Figure 2:
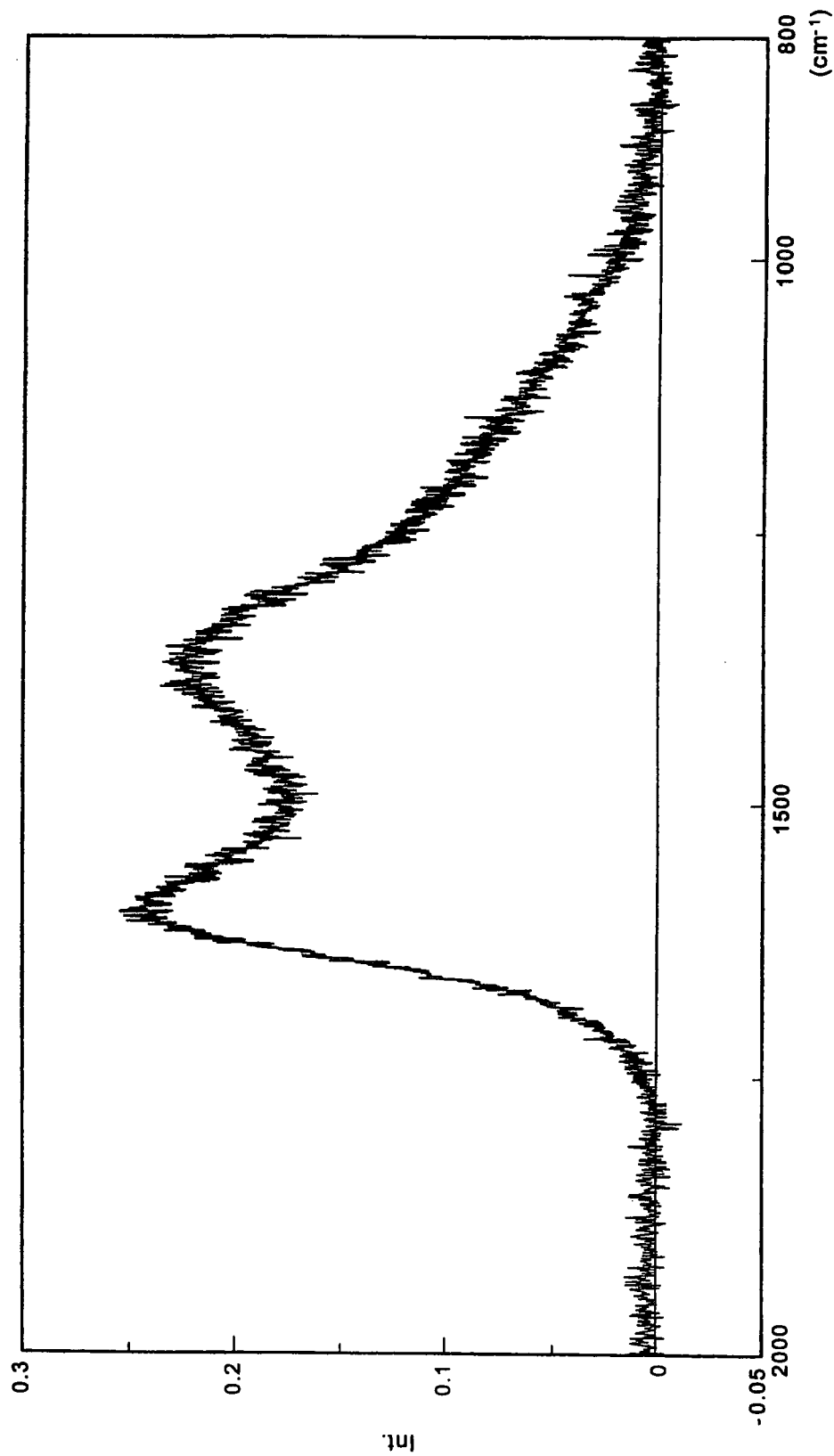
FIG. 2 shows a Raman spectrum of the activated carbon material produced in Example 1. The vertical axis corresponds to spectrum intensity (Int.), and the horizontal axis corresponds to Raman shift (measurement wavelength: $cm^{-1}$).

The specific surface area of the activated carbon material was found to be 930 m$^2$/g. The pore volume of pores of the activated carbon material having a size of 20 to 50 Å as measured by means of a BJH method was found to be 0.0416 ml/g. FIG. 2 shows a Raman spectrum of the activated carbon material. The ratio of the height of the D peak to that of the G peak was found to be 0.92.

When charging and discharging were performed at a current of 5 mA (1.6 mA/cm$^2$) and 2.5 V, the capacitance was found to be 36.5 F/g and 31.0 F/ml, and the percent maintenance of capacitance after 20-cycle charging/discharging was found to be 98.4%. When charging and discharging were performed at a current of 5 mA (1.6 mA/cm$^2$) and 3.0 V, the capacitance was found to be 37.7 F/g and 32.0 F/ml, and the percent maintenance of capacitance after 20-cycle charging/discharging was found to be 96.9%.

EXAMPLE 2

The activated carbon material produced through the method of Example 1 was mixed with vapor grown carbon fiber (5 mass %), to thereby prepare a polarizable electrode material. When charging and discharging were performed at a current of 5 mA (1.6 mA/cm$^2$) and 2.5 V, the capacitance was found to be 36.4 F/g and 32.4 F/ml, and the percent maintenance of capacitance after 20-cycle charging/discharging was found to be 98.9%. When charging and discharging were performed at a current of 5 mA (1.6 mA/cm$^2$) and 3.0 V, the capacitance was found to be 39.5 F/g and 35.2 F/ml, and the percent maintenance of capacitance after 20-cycle charging/discharging was found to be 97.7%.

EXAMPLE 3

The procedure of Example 1 was repeated, except that coal pitch (product of Kawasaki Steel Corporation) having a softening point of 86° C. was subjected to heat treatment at 500° C. and 800° C., to thereby produce an activated carbon material.

The activated carbon material was employed as a polarizable electrode material. The specific surface area of the activated carbon material was found to be 173 m$^2$/g. The pore volume of pores of the activated carbon material having a size of 20 to 50 Å as measured by means of a BJH method was found to be 0.0271 ml/g. The ratio of the height of the D peak of a Raman spectrum of the activated carbon material to that of the G peak of the Raman spectrum was found to be 0.93.

The activated carbon material was observed under a transmission electron microscope (TEM) as shown in FIG. 3 and the activated carbon material was found to have no graphite structure and to have merely a turbostratic structure.

When charging and discharging were performed at a current of 5 mA (1.6 mA/cm$^2$) and 2.5 V, the capacitance was found to be 32.6 F/g and 31.9 F/ml, and the percent maintenance of capacitance after 20-cycle charging/discharging was found to be 98.7%. When charging and discharging were performed at a current of 5 mA (1.6 mA/cm$^2$) and 3.0 V, the capacitance was found to be 35.5 F/g and 34.8 F/ml, and the percent maintenance of capacitance after 20-cycle charging/discharging was found to be 97.2%.

EXAMPLE 4

The activated carbon material produced through the method of Example 3 was mixed with vapor grown carbon fiber which had undergone alkali activation (pore volume of micropores: 0.3 ml, BET specific surface area: 530 m$^2$/g) (5 mass %), to thereby prepare a polarizable electrode material. When charging and discharging were performed at a current of 5 mA (1.6 mA/cm$^2$) and 2.5 V, the capacitance was found to be 33.5 F/g and 33.5 F/ml, and the percent maintenance of capacitance after 20-cycle charging/discharging was found to be 99.0%. When charging and discharging were performed at a current of 5 mA (1,6mA/cm$^2$) and 3.0 V, the capacitance was found to be 34.5 F/g and 34.5 F/ml, and the percent maintenance of capacitance after 20-cycle charging/discharging was found to be 98.0%.

COMPARATIVE EXAMPLE 1

Petroleum coke serving as a carbon material was mixed with KOH and placed into a crucible such that the ratio by mass of the KOH to the coke was 2.5 and the mixture was held at 750° C. for 60 minutes to effect activation. The activated carbon material washed with 1N hydrochloric acid and then with distilled water to remove remaining KOH and metallic impurities. This was vacuum dried at 200° C. to obtain activated carbon. The specific surface area of the activated carbon material was found to be 1,905 m$^2$/g. The ratio of the height of the D peak of a Raman spectrum of the activated carbon material to that of the G peak of the Raman spectrum was found to be 0.98.

When charging and discharging were performed at a current of 5 mA (1.6 mA/cm$^2$) and 2.5 V, the capacitance was found to be 44.5 F/g and 24.0 F/ml, and the percent maintenance of capacitance after 20-cycle charging/discharging was found to be 96.3%. When charging and discharging were performed at a current of 5 mA (1.6 mA/cm$^2$) and 3.0 V, the capacitance was found to be 45.0 F/g and 24.3 F/ml, and the percent maintenance of capacitance after 20-cycle charging/discharging was found to be 94.0%.

COMPARATIVE EXAMPLE 2

MCMB (mesocarbon microbeads, product of Osaka Gas Co., Ltd.) serving as a carbon material was mixed with KOH and placed into a crucible such that the ratio by mass of the KOH to the MCMB was 5 and the mixture was held at 750° C. for 60 minutes to effect activation. The activated carbon material washed with 1N hydrochloric acid and then with distilled water to remove remaining KOH and metallic impurities. This was vacuum dried at 200° C. to obtain activated carbon. The specific surface area of the activated carbon material was found to be 127 m$^2$/g. The pore volume of pores of the activated carbon material having a size of 20 to 50 Å was found to be 0.013 ml/g. The ratio of the height of the D peak of a Raman spectrum of the activated carbon material to that of the G peak of the Raman spectrum was found to be 0.92.

When charging and discharging were performed at a current of 5 mA (1.6 mA/cm$^2$) and 2.5 V, the capacitance was found to be 10.2 F/g and 9.4 F/ml, and the percent maintenance of capacitance after 20-cycle charging/discharging was found to be 99.1%. When charging and discharging were performed at a current of 5 mA (1.6 mA/cm$^2$) and 3.0 V, the capacitance was found to be 11.5 F/g and 10.6 F/ml, and the percent maintenance of capacitance after 20-cycle charging/discharging was found to be 98.5%.

EXAMPLE 5

Coal pitch (product of Kawasaki Steel Corporation) having a softening point of 86° C. was subjected to first-stage heat treatment at 500° C. and then to second-stage heat treatment at 700° C. The resultant carbonaceous material was mixed with KOH such that the ratio by mass of the KOH to the coal pitch was 2.5 and with vapor grown carbon fiber (fiber diameter: 50-500 nm, fiber length: about 20 μm) such that the ratio by mass of the carbon fiber to the coal pitch was 0.05, and the resultant mixture was placed in a crucible up to a height of 80 mm from the bottom. The crucible was heated to 750° C. at a temperature increase rate of 350° C./hour, and the temperature of the crucible was maintained at 750° C. for 60 minutes, to thereby allow activation of the pitch to proceed. The thus-activated carbon material washed with 1N hydrochloric acid, and then washed with distilled water, to thereby remove residual KOH and metallic impurities. The thus-washed carbon material was dried under vacuum at 200° C., to thereby produce an activated carbon material.

In a case where vapor grown carbon fiber was not used, an alkali molten liquid rose up to a height of 560 mm from the bottom of the crucible. In this Example, by using vapor grown carbon fiber, an alkali molten liquid rose up no higher than a height of 120 mm (1.5 times as high as the filling height of the mixture) from the bottom of the crucible, and productivity was drastically improved.

The specific surface area of the activated carbon material was found to be 930 m$^2$/g. The pore volume of pores of the activated carbon material having a size of 20 to 50 Å as measured by means of a BJH method was found to be 0.0450 ml/g. The ratio of the height of the D peak to that of the G peak was found to be 0.90. When charging and discharging were performed at a current of 5 mA (1.6 mA/cm$^2$) and 2.5 V, the capacitance was found to be 37.0 F/g and 31.5 F/ml, and the percent maintenance of capacitance after 20-cycle charging/discharging was found to be 99.5%. When charging and discharging were performed at a current of 5 mA (1.6 mA/cm$^2$)

and 3.0 V, the capacitance was found to be 38.0 F/g and 32.3 F/ml, and the percent maintenance of capacitance after 20-cycle charging/discharging was found to be 98.2%. As compared to Example 1 where vapor grown carbon fiber was not used, the percent maintenance of capacitance was improved.

EXAMPLE 6

A phenol resin (trade name: Bellpearl R800, product of Kanebo, Ltd.) was carbonized in a nitrogen atmosphere at 700° C. for four hours. The thus-carbonized product (150 g), vapor grown carbon fiber (average fiber diameter: about 500 nm, fiber length: about 20 μm) (7.5 g), and potassium hydroxide pellets (473 g) were placed in a metallic crucible (100 mmφ×530 mm). The thickness of a layer of the mixture of the carbonized product, vapor grown carbon fiber, and potassium hydroxide was found to be 80 mm. The crucible was placed in an electric furnace and heated to 750° C. at a temperature increase rate of 350° C./hr under a nitrogen stream, and the temperature of the crucible was maintained at 750° C. for 30 minutes. After completion of activation, the crucible was removed from the furnace, and then visually observed. The results revealed that an alkali molten liquid rose up to a height of 130 mm from the bottom of the crucible. The thus-activated carbon material washed with water and 1N hydrochloric acid, and then washed with distilled water, to thereby remove residual alkali and metallic impurities. After the thus-washed activated carbon material was dried, BET specific surface area and capacitance were measured. The BET specific surface area was found to be 2,335 m$^2$/g; and the capacitance was found to be 42.9 F/g (at 1.6 mA/cm$^2$), 36.7 F/g (at 16 mA/cm$^2$), 24.7 F/g (at 48 mA/cm$^2$), and 26.7 F/ml (at 1.6 mA/cm$^2$).

Figure 4:
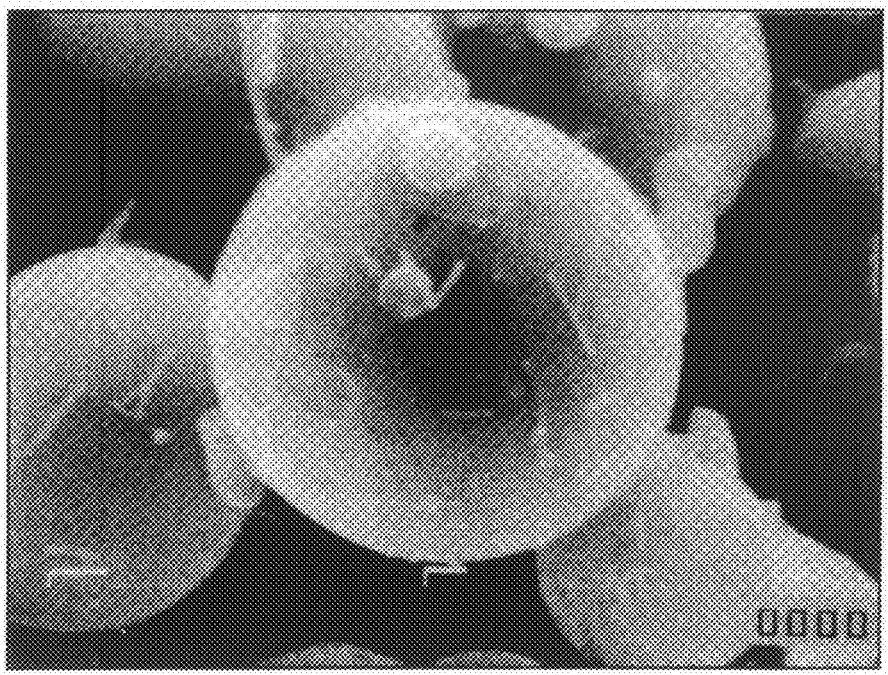
FIG. 4 shows an electron micrograph of the activated carbon material produced in Example 6 (magnification: ×5,000).

The obtained activated carbon was observed under a transmission electron microscope (TEM) as shown in FIG. 4 and the activated carbon material was found to have a spherical shape on the surface of which carbon fibers are melt-bonded.

EXAMPLE 7

A phenol resin (trade name: Bellpearl R800, product of Kanebo, Ltd.) was carbonized in a nitrogen atmosphere at 700° C. for four hours. The thus-carbonized product (150 g), vapor grown carbon fiber (average fiber diameter: about 500 nm, fiber length: about 20 μm) (15 g), and potassium hydroxide pellets (495 g) were placed in a metallic crucible (100 mmφ×530 mm). The thickness of a layer of the mixture of the carbonized product, vapor grown carbon fiber, and potassium hydroxide was found to be 85 mm. The crucible was placed in an electric furnace and heated to 750° C. at a temperature increase rate of 350° C./hr under a nitrogen stream, and the temperature of the crucible was maintained at 750° C. for 30 minutes. After completion of activation, the crucible was removed from the furnace, and then visually observed. No rise of an alkali molten liquid was observed. The thus-activated carbon material washed with water and 1N hydrochloric acid. After the thus-washed activated carbon material was dried, BET specific surface area and capacitance were measured. The BET specific surface area was found to be 2,400 m$^2$/g; and the capacitance was found to be 40.6 F/g (at 1.6 mA/cm$^2$), 34.5 F/g (at 16 mA/cm$^2$), 23.3 F/g (at 48 mA/cm$^2$), and 25.9 F/ml (at 1.6 mA/cm$^2$).

EXAMPLE 8

A phenol resin (trade name: Bellpearl R800, product of Kanebo, Ltd.) was carbonized in a nitrogen atmosphere at 700° C. for four hours. The thus-carbonized product (150 g), wood beaten pulp (48 g), and potassium hydroxide pellets (472 g) were placed in a metallic crucible (100 mmφ×530 mm). The thickness of a layer of the mixture of the carbonized product, pulp, and potassium hydroxide was found to be 170 mm. The crucible was placed in an electric furnace and heated to 750° C. at a temperature increase rate of 350° C./hr under a nitrogen stream, and the temperature of the crucible was maintained at 750° C. for 30 minutes. After completion of activation, the crucible was removed from the furnace, and then visually observed. The results revealed that an alkali molten liquid rose up to a height of 190 mm from the bottom of the crucible. The thus-activated carbon material washed with water, 1N hydrochloric acid and then with distilled water to thereby remove residual alkali and metallic impurities. After the thus-washed activated carbon material was dried, BET specific surface area and capacitance were measured. The BET specific surface area was found to be 1,836 m$^2$/g; and the capacitance was found to be 32.8 F/g (at 1.6 MA/cm$^2$) and 24.6 F/ml (at 1.6 mA/cm$^2$).

EXAMPLE 9

A phenol resin (trade name: Bellpearl R800, product of Kanebo, Ltd.) was carbonized in a nitrogen atmosphere at 700° C. for four hours. The thus-carbonized product (150 g), wood beaten pulp carbonized at 700° C. (7.5 g), and potassium hydroxide pellets (472 g) were placed in a metallic crucible (100 mmφ×530 mm). The thickness of a layer of the mixture of the carbonized product, pulp, and potassium hydroxide was found to be 75 mm. The crucible was placed in an electric furnace and heated to 750° C. at a temperature increase rate of 350° C./hr under a nitrogen stream, and the temperature of the crucible was maintained at 750° C. for 30 minutes. After completion of activation, the crucible was removed from the furnace, and then visually observed. The results revealed that an alkali molten liquid rose up to a height of 170 mm from the bottom of the crucible. The thus-activated carbon material washed with, 1N hydrochloric acid and then with distilled water to thereby remove residual alkali and metallic impurities. After the thus-washed activated carbon material was dried, BET specific surface area and capacitance were measured. The BET specific surface area was found to be 2,151 m$^2$/g; and the capacitance was found to be 39.8 F/g (at 1.6 mA/cm$^2$) and 25.6 F/ml (at 1.6 mA/cm$^2$).

COMPARATIVE EXAMPLE 3

A phenol resin (trade name: R800, product of Kanebo, Ltd.) was carbonized in a nitrogen atmosphere at 700° C. for four hours. The thus-carbonized product (150 g) and potassium hydroxide pellets (450 g) were placed in a metallic crucible (100 mmφ×530 mm). The thickness of a layer of the mixture of the carbonized product and potassium hydroxide was found to be 70 mm. The crucible was placed in an electric furnace and activation was effected as in Example 6. After completion of activation, the crucible was removed from the furnace, and then visually observed. The results revealed that an alkali molten liquid rose up to a height of 490 mm from the bottom of the crucible.

The thus-activated carbon material washed with 1N hydrochloric acid and then with distilled water to thereby remove residual alkali and metallic impurities.

The product was evaluated as in Example 6. The capacitance was found to be 39.4 F/g (at 1.6 m/A/cm$^2$), 31.7 F/g (at 16 mA/cm$^2$) and 17.9 F/g (at 48 MA/cm$^2$).

COMPARATIVE EXAMPLE 4

A phenol resin (trade name: R800, product of Kanebo, Ltd.) was carbonized in a nitrogen atmosphere at 700° C. for four hours. To the thus-carbonized product (150 g) carbon fiber chop (KrecaChop M-101S; fiber diameter: 14.5 µm) (7.5 g) was added and after potassium hydroxide pellets (473 g) were added thereto the mixture was mixed well and placed in a inconel crucible (100 mmφ×530 mm). The thickness of a layer of the mixture of the carbonized product and potassium hydroxide was found to be 70 mm. The crucible was placed in an electric furnace and activation was effected as in Example 6. After completion of activation, the crucible was removed from the furnace, and then visually observed. The results revealed that an alkali molten liquid rose up to a height of 530 mm from the bottom of the crucible, and thus no effect of suppressing the expansion of the molten liquid was observed.

INDUSTRIAL APPLICABILITY

The method of the present invention comprising two-stage heat treatment of a coal-based pitch at different temperature ranges and activating with an alkali enables production of an activated carbon material exhibiting excellent durability and high capacitance (F/ml) without application of excessive voltage.

When the activated carbon material is mixed with vapor grown carbon fiber, a polarizable electrode and an electric double layer capacitor exhibiting more excellent characteristics can be produced.

By adding fibrous carbon to a reactant (i.e., a composition containing the carbonaceous raw material and the alkali metal compound), expansion of an alkali molten liquid can be suppressed during activation, and productivity can be improved.

Furthermore, employment of an fibrous carbon material which is excellent in conductivity as a fibrous material, activated carbon material on which carbon fiber is melt-bonded can be produced, which enables production of an electric double layer capacitor and a polarizable electrode exhibiting excellent charge/discharge characteristics at high current density.

The invention claimed is:

1. An activated carbon material having a BET specific surface area of 173 to 1,000 $m^2/g$ as measured by means of a nitrogen adsorption method, and the ratio of the height of the D peak (1,360 $cm^{-1}$) of a Raman spectrum of the activated carbon material to that of the G peak (1,580 $cm^{-1}$) of the Raman spectrum is 0.8 to 0.93, and wherein pores of the activated carbon material having a size of 20 to 50 Å as measured by means of a BJH method employing nitrogen adsorption have a pore volume of at least 0.02 ml/g.

2. The activated carbon material as claimed in claim 1, wherein the activated carbon material contains no graphite microcrystals.

3. A polarizable electrode material comprising an activated carbon material as recited in claim 1.

4. An electric double layer capacitor comprising a polarizable electrode prepared from a polarizable electrode material as recited in claim 3.

5. A polarizable electrode material comprising an activated carbon material as recited in claim 1 and optionally vapor grown carbon fiber.

6. The polarizable electrode material as claimed in claim 5, wherein the vapor grown carbon fiber is fused onto at least a portion of the surface of the activated carbon material material.

7. The polarizable electrode material as claimed in claim 5, wherein the amount of the vapor grown carbon fiber is 0.05 to 50 mass %.

8. The polarizable electrode material as claimed in claim 5, wherein each fiber filament of the vapor grown carbon fiber contains a hollow space extending along its center axis, and has an outer diameter of 2 to 500 nm and an aspect ratio of 10 to 15,000.

9. An electric double layer capacitor comprising a polarizable electrode prepared from a polarizable electrode material as recited in claim 5.

\* \* \* \* \*